(Model.)
J. W. EDWARDS.
CAN HOLDER.
No. 307,929. Patented Nov. 11, 1884.
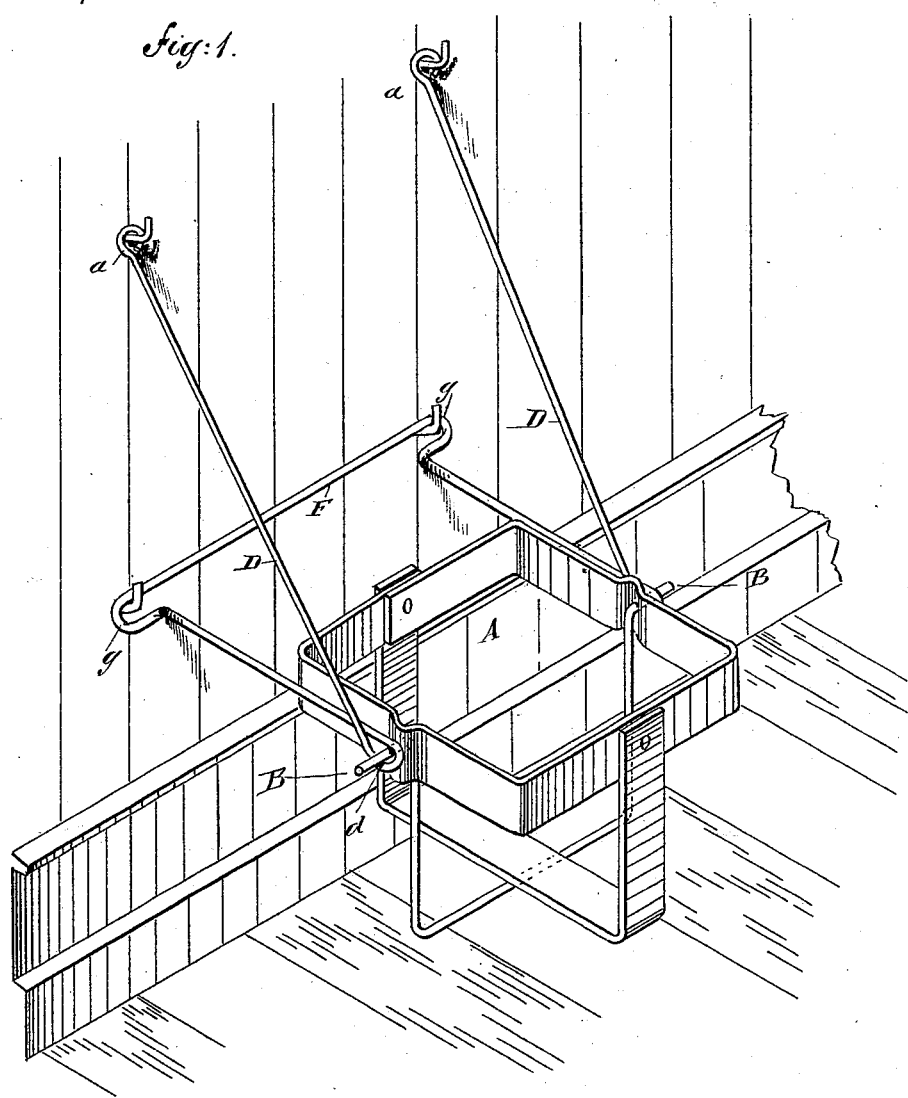
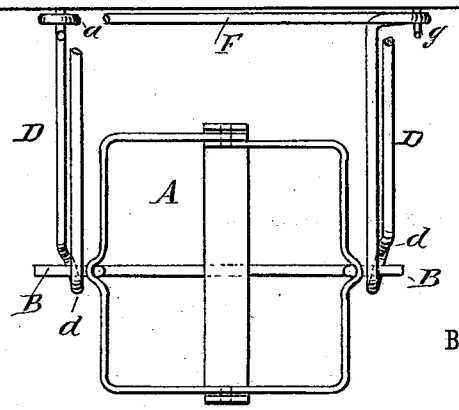
WITNESSES:
INVENTOR:
J. W. Edwards
BY
ATTORNEYS.

UNITED STATES PATENT OFFICE.

JOHN W. EDWARDS, OF SEATTLE, WASHINGTON TERRITORY.

CAN-HOLDER.

SPECIFICATION forming part of Letters Patent No. 307,929, dated November 11, 1884.

Application filed March 26, 1884. (Model.)

*To all whom it may concern:*

Be it known that I, JOHN W. EDWARDS, of Seattle, in the county of King and Territory of Washington, have invented a new and Improved Can-Holder, of which the following is a full, clear, and exact description.

The object of my invention is to provide a new and improved apparatus for holding oil-cans and other vessels in such a manner that they can be readily tilted to draw off the contents.

The invention consists in the construction and arrangement of parts, as will be hereinafter described and claimed.

Reference is to be had to the accompanying drawings, forming part of this specification, in which similar letters of reference indicate corresponding parts in both the figures.

Figure 1 is a perspective view of my improved can-holder; and Fig. 2 is a plan view of the same, parts being broken out.

A basket or cage, A, either square or circular, and adapted to receive and hold a can or a carboy, &c., is provided at its top with two opposite pivots, B, arranged at the center of the sides of the top piece, so that when the cage or basket is suspended by means of the said pivots it will hang vertically. A rod is bent to form two triangular or like brackets, D, having eyes $a$ at the upper ends, eyes $d$ at the points, and eyes $g$ at the inner ends of the horizontal parts, which horizontal parts have their inner ends united by a cross-bar, F. The bracket-frame is held on a wall, counter, standard, table, &c., by means of screws, spikes, or hooks passed through the eyes $a\,g$ in such a manner that the bracket-frame projects from the said wall, &c., and the cage or basket A is suspended by means of its pivots B from the bracket-frame, the pivots passing through the eyes $d$. The cage or basket swings easily between the two brackets, and can be tilted very easily more or less to draw off the contents of a can or carboy, &c., placed in the cage or basket. The cage or basket can be hung so high that children cannot reach it, and it cannot be upset. Bottles and jars can easily be placed under the can, and one man can draw liquid from a very heavy can, that would have to be handled by several men if not held in my improved can-holder. Preferably the bracket-frame is made in the manner described, but can be made in any suitable manner, if desired.

The cage or basket A can be constructed in the manner shown, or in any other suitable manner.

Having thus described my invention, I claim as new and desire to secure by Letters Patent—

1. A bracket-frame made from a rod bent to form two united brackets, each provided with an eye at the top and bottom, and with an eye at the outer end, substantially as herein shown and described.

2. The combination, with the brackets D, united by the cross-piece F, and provided with eyes $a$, $d$, and $g$, of the cage or basket A, provided with pivots B, passed through the eyes $d$ in the bracket-frames E, substantially as herein shown and described.

JOHN W. EDWARDS.

Witnesses:
 LEWIS D. W. SHELTON,
 J. M. LYON.